United States Patent
Fernandez

(10) Patent No.: US 10,106,648 B2
(45) Date of Patent: Oct. 23, 2018

(54) METHOD OF POLYMERIZING END-CAPPED POLYCARBONATE AND END-CAPPED POLYCARBONATES DERIVED THEREFROM

(71) Applicant: SABIC GLOBAL TECHNOLOGIES B.V., Bergen op Zoom (NL)

(72) Inventor: Ignacio Vic Fernandez, Murcia (ES)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/520,541

(22) PCT Filed: Nov. 19, 2015

(86) PCT No.: PCT/IB2015/058972
§ 371 (c)(1),
(2) Date: Apr. 20, 2017

(87) PCT Pub. No.: WO2016/079706
PCT Pub. Date: May 26, 2016

(65) Prior Publication Data
US 2017/0313815 A1 Nov. 2, 2017

(30) Foreign Application Priority Data
Nov. 19, 2014 (EP) .................................. 14382460

(51) Int. Cl.
*C08G 64/14* (2006.01)
*C08G 64/30* (2006.01)
*C08G 64/42* (2006.01)

(52) U.S. Cl.
CPC .......... *C08G 64/14* (2013.01); *C08G 64/307* (2013.01); *C08G 64/42* (2013.01)

(58) Field of Classification Search
USPC ................................ 528/196, 198, 271, 272
See application file for complete search history.

(56) References Cited

U.S. PATENT DOCUMENTS

| 6,022,943 A | 2/2000 | Inoue et al. |
| 6,262,218 B1 | 7/2001 | Inoue et al. |
| 6,548,623 B2 | 4/2003 | Brunelle et al. |
| 6,620,902 B2 | 9/2003 | Shimoda et al. |
| 7,498,400 B2 | 3/2009 | Jansen et al. |
| 2003/0105271 A1 | 6/2003 | Brack et al. |

FOREIGN PATENT DOCUMENTS

| WO | 03010218 A1 | 2/2003 |
| WO | 2015155737 A1 | 10/2015 |

OTHER PUBLICATIONS

International Search Report for International Application No. PCT/IB2015/058972; International Filing Date Nov. 19, 2015; dated Feb. 17, 2016; 5 pages.
Written Opinion for International Application No. PCT/IB2015/058972; International Filing Date Nov. 19, 2015; dated Feb. 17, 2016; 7 pages.

*Primary Examiner* — Terressa Boykin
(74) *Attorney, Agent, or Firm* — Cantor Colburn LLP

(57) ABSTRACT

In an embodiment, a melt polymerization process comprises melt polymerizing a carbonate compound and a dihydroxy compound in the presence of a catalyst composition to form a polycarbonate; and adding an end-capping agent comprising a mono-phenolic compound to the polycarbonate, wherein the adding of the end-capping agent comprises at least one of adding the end-capping agent just upstream of a final polymerization unit, adding the end-capping agent directly into the final polymerization unit, and adding the end-capping agent downstream of the final polymerization unit; wherein a molecular weight of the polycarbonate increases by less than 10% downstream of the final polymerization unit.

17 Claims, 1 Drawing Sheet

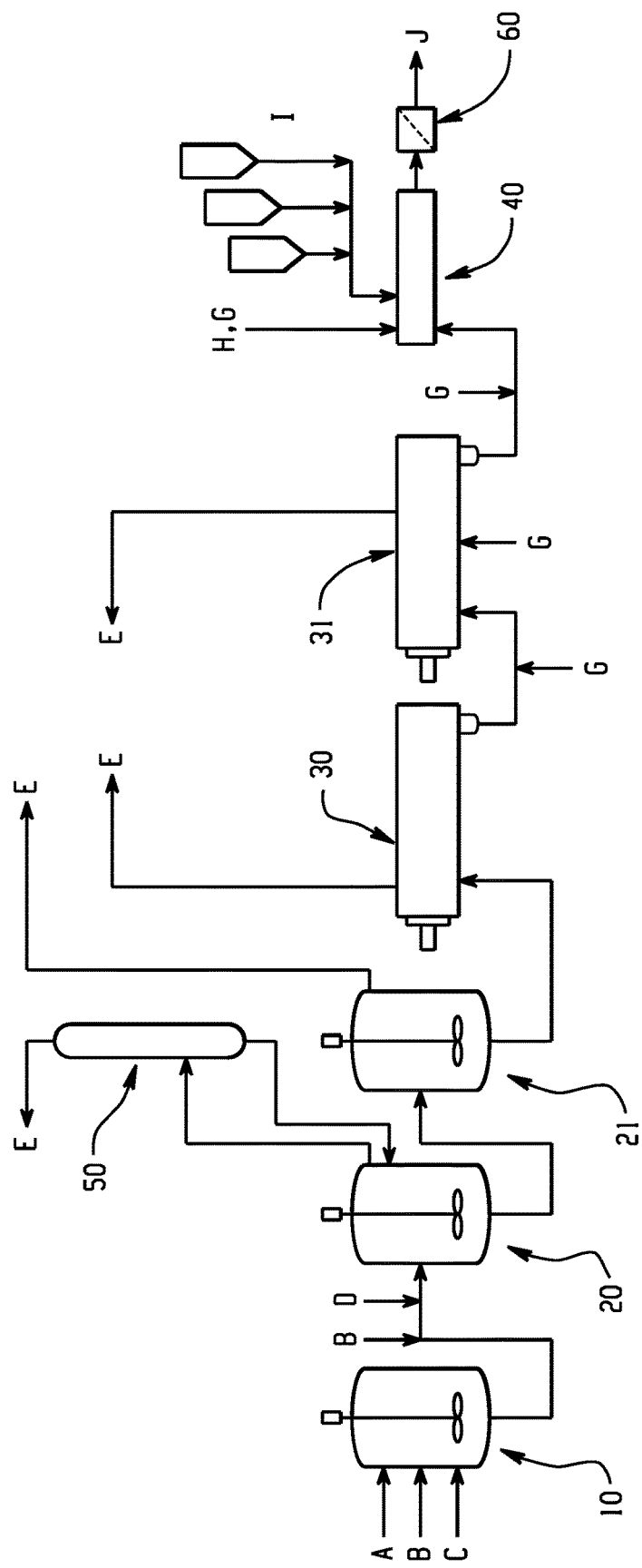

METHOD OF POLYMERIZING END-CAPPED POLYCARBONATE AND END-CAPPED POLYCARBONATES DERIVED THEREFROM

CROSS REFERENCE TO RELATED APPLICATIONS

This application is a National Stage application of PCT/IB2015/058972, filed Nov. 19, 2015, which claims the benefit of European Patent Application No. 14382460.5, filed Nov. 19, 2014, both of which are incorporated by reference in their entirety herein.

TECHNICAL FIELD

This application relates to the melt polymerization of end-capped polycarbonate.

BACKGROUND

U.S. Pat. No. 7,498,400 discloses a method of reducing the number of activated carbonate end groups formed during the melt transesterification formation of polycarbonate by reacting a dihydroxy compound with an activated diaryl carbonate in the presence of an esterification catalyst and a monohydroxy chainstopper to produce a polycarbonate.

U.S. Pat. No. 6,548,623 discloses a method of preparing a polycarbonate containing low or undetectable levels of Fries rearrangement product prepared by the melt reaction of a dihydroxy aromatic compound with an ester-substituted diaryl carbonate. U.S. Pat. No. 6,548,623 discloses that where an exogenous monofunctional phenol is added at the outset of the reaction between the ester substituted diaryl carbonate and the dihydroxy aromatic compound, high levels of incorporation of phenol are observed.

Improved methods for preparing polycarbonate in the presence of an end-capping agent are desired.

BRIEF DESCRIPTION

Disclosed herein are methods for melt polymerizing polycarbonate and the polycarbonate made therefrom.

In an embodiment: a melt polymerization process comprises melt polymerizing a carbonate compound and a dihydroxy compound in the presence of a catalyst composition to form a polycarbonate; and adding an end-capping agent comprising a mono-phenolic compound to the polycarbonate, wherein the adding of the end-capping agent comprises at least one of adding the end-capping agent just upstream of a final polymerization unit, adding the end-capping agent directly into the final polymerization unit, and adding the end-capping agent downstream of the final polymerization unit; wherein a molecular weight of the polycarbonate increases by less than 10% downstream of the final polymerization unit.

In another embodiment: a process for end-capping a polycarbonate in a melt polymerization process comprises melt polymerizing a carbonate compound and a dihydroxy compound in the presence of a catalyst composition to form the polycarbonate; determining a desired end-cap level; and adding an end-capping agent comprising a mono-phenolic compound to the polycarbonate to attain the desired end-cap level, wherein the adding the end-capping agent comprises at least one of adding the end-capping agent just upstream of a final polymerization unit, adding the end-capping agent directly into the final polymerization unit, and adding the end-capping agent downstream of the final polymerization unit; wherein a molecular weight of the polycarbonate increases by less than 10% downstream of the final polymerization unit.

In an embodiment: a melt polymerization system, comprising: a carbonate source supply; a dihydroxy compound supply; a catalyst supply; an oligomerization unit in operable communication with the carbonate source supply, the dihydroxy compound supply, and the catalyst supply; a polymerization unit in operable communication with the oligomerization unit; an extruder in operable communication with the polymerization unit; and an end-capping agent supply configured to introduce end-capping agent downstream of the oligomerization unit.

The above described and other features are exemplified by the following FIGURE and detailed description.

BRIEF DESCRIPTION OF THE DRAWING

Refer now to the FIGURE, which is an exemplary embodiment, and wherein the like elements are numbered alike.

FIG. 1 illustrates a process to melt polymerize polycarbonate.

DETAILED DESCRIPTION

The melt polymerization of a carbonate compound (such as a diaryl carbonate) and a dihydroxy compound results in polycarbonate with end groups derived from both the diaryl carbonate and the dihydroxy compound. An example of a polycarbonate comprising an end group derived from bisphenol A (BPA) and an end group derived from diphenyl carbonate (DPC) is the polycarbonate of formula (10):

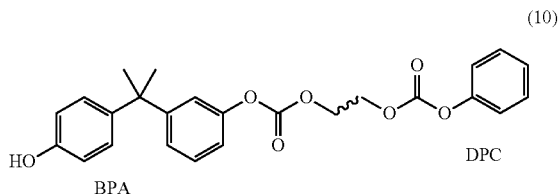

The dihydroxy derived end groups, for example, the BPA endgroup of formula (10), tend to be bulkier and can result in improved impact properties, but the presence of the unreacted hydroxyl group reduces the hydrolytic stability of the polycarbonate. The carbonate compound derived end groups, for example, the DPC endgroup of formula (10), are therefore generally present in an amount of greater than or equal to 45 mole percent (mol %), more specifically, greater than or equal to 60 mol %, more specifically, greater than or equal to 80 mol % based on the total moles of end groups, e.g., in order to increase the hydrolytic stability of the polycarbonate or ageing properties.

The inventors therefore developed a method of improving the impact properties of melt polycarbonate by reacting the carbonate derived end groups with an end capping agent comprising one hydroxyl group that is bulkier than the carbonate derived end group. Introducing an end-capping agent can result in a polycarbonate with an end-capping level of greater than or equal to 50%, specifically, greater than or equal to 60%, more specifically, greater than or equal to 75%, for example, while improving the impact properties. The end-capping agent can comprise para cumyl phenol (PCP), dicumyl phenol (DCP), p-tert-butyl phenol, or a combination comprising one or more of the foregoing.

As used herein, the end-capping level in percent (% EC) is determined by the following equation:

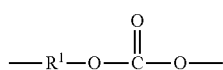

wherein ppm OH is the amount of hydroxyl end groups in parts per million by weight (ppm) and Mn is the number averaged molecular weight based on polycarbonate standards in Daltons. The ppm OH can be determined by Fourier Transform Infrared Spectroscopy (FTIR), for example, on a Perkin Elmer FTIR Spectrum One Device by dissolving 0.5 grams (g) of the polycarbonate sample in 25 milliliters (mL) of dried chloroform, measuring the absorbance at a wavelength of 3,584 inverse centimeters (cm$^{-1}$) using a univariable calibration, and normalizing the absorbance by dividing the absorbance by the absorbance at 2,779 cm$^{-1}$.

"Polycarbonate" (PC) as used herein means a polymer having repeating structural carbonate units of formula (1)

$$—R^1—O—\overset{\overset{O}{\|}}{C}—O— \quad (1)$$

in which at least 60% of the total number of R$^1$ groups contain aromatic moieties and the balance thereof are aliphatic, alicyclic, or aromatic. Each R$^1$ can be a C$_{6-30}$ aromatic group, that is, contains at least one aromatic moiety. R$^1$ can be derived from an aromatic dihydroxy compound of the formula HO—R$^1$—OH, in particular of formula (2), wherein each of A$^1$ and A$^2$ is a monocyclic divalent aromatic group and Y$^1$ is a single bond or a bridging group having one or more atoms that separate A$^1$ from A$^2$. One atom can separate A$^1$ from A$^2$. Specifically, each R$^1$ can be derived from a bisphenol of formula (3), wherein R$^a$ and R$^b$ are each independently a halogen, C$_{1-12}$ alkoxy, or C$_{1-12}$ alkyl; and p and q are each independently integers of 0 to 4. It will be understood that when p or q is less than 4, the valence of each carbon of the ring is filled by hydrogen. Also in formula (3), X$^a$ is a bridging group connecting the two hydroxy-substituted aromatic groups, where the bridging group and the hydroxy substituent of each C$_6$ arylene group are disposed ortho, meta, or para (specifically para) to each other on the C$_6$ arylene group. The bridging group X$^a$ can be a single bond, —O—, —S—, —S(O)—, —S(O)$_2$—, —C(O)—, or a C$_{1-18}$ organic group. The C$_{1-18}$ organic bridging group can be cyclic or acyclic, aromatic or non-aromatic, and can further comprise heteroatoms such as halogens, oxygen, nitrogen, sulfur, silicon, or phosphorous. The C$_{1-18}$ organic group can be disposed such that the C$_6$ arylene groups connected thereto are each connected to a common alkylidene carbon or to different carbons of the C$_{1-18}$ organic bridging group. Each p and q can be 1, and R$^a$ and R$^b$ can each be a C$_{1-3}$ alkyl group, specifically, methyl, disposed meta to the hydroxy group on each arylene group.

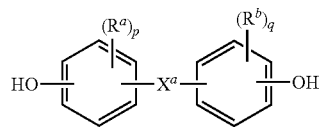

X$^a$ can be a substituted or unsubstituted C$_{3-18}$ cycloalkylidene, a C$_{1-25}$ alkylidene of formula —C(R$^c$)(R$^d$)— wherein R$^c$ and R$^d$ are each independently hydrogen, C$_{1-12}$ alkyl, C$_{1-12}$ cycloalkyl, C$_{7-12}$ arylalkyl, C$_{1-12}$ heteroalkyl, or cyclic C$_{7-12}$ heteroarylalkyl, or a group of the formula —C(=R$^e$)— wherein R$^e$ is a divalent C$_{1-12}$ hydrocarbon group. Groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene.

X$^a$ can be a C$_{1-18}$ alkylene, a C$_{3-18}$ cycloalkylene, a fused C$_{6-18}$ cycloalkylene, or a group of the formula —B$^1$-G-B$^2$— wherein B$^1$ and B$^2$ are the same or different C$_{1-6}$ alkylene and G is a C$_{3-12}$ cycloalkylidene or a C$_{6-16}$ arylene. For example, X$^a$ can be a substituted C$_{3-18}$ cycloalkylidene of formula (4), wherein R$^r$, R$^p$, R$^q$, and R$^t$ are each independently hydrogen, halogen, oxygen, or C$_{1-12}$ hydrocarbon groups; Q is a direct bond, a carbon, or a divalent oxygen, sulfur, or —N(Z)— where Z is hydrogen, halogen, hydroxy, C$_{1-12}$ alkyl, C$_{1-12}$ alkoxy, or C$_{1-12}$ acyl; r is 0 to 2, t is 1 or 2, q is 0 or 1, and k is 0 to 3, with the proviso that at least two of R$^r$, R$^p$, R$^q$, and R$^t$ taken together are a fused cycloaliphatic, aromatic, or heteroaromatic ring. It will be understood that where the fused ring is aromatic, the ring as shown in formula (4) will have an unsaturated carbon-carbon linkage where the ring is fused. When k is one and i is 0, the ring as shown in formula (4) contains 4 carbon atoms, when k is 2, the ring as shown in formula (4) contains 5 carbon atoms, and when k is 3, the ring contains 6 carbon atoms. Two adjacent groups (e.g., R$^q$ and R$^t$ taken together) can form an aromatic group, and R$^q$ and R$^t$ taken together can form one aromatic group and R$^r$ and R$^p$ taken together can form a second aromatic group. When R$^q$ and R$^t$ taken together form an aromatic group, R$^p$ can be a double-bonded oxygen atom, i.e., a ketone.

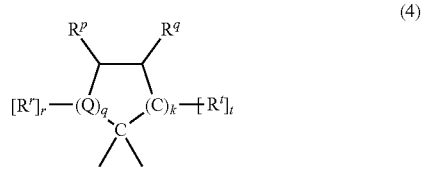

Bisphenols wherein X$^a$ is a cycloalkylidene of formula (4) can be used in the manufacture of polycarbonates containing phthalimidine carbonate units of formula (1a), wherein R$^a$, R$^b$, p, and q are as in formula (3), R$^3$ is each independently a C$_{1-6}$ alkyl, j is 0 to 4, and R$_4$ is hydrogen, C$_{1-6}$ alkyl, or a substituted or unsubstituted phenyl, for example, a phenyl substituted with up to five C$_{1-6}$ alkyls. For example, the phthalimidine carbonate units are of formula (1b), wherein R$^5$ is hydrogen, phenyl optionally substituted with up to five C$_{1-6}$ alkyls, or C$_{1-4}$ alkyl. In formula (1b), R$^5$ can be hydrogen, methyl, or phenyl, specifically, phenyl. Carbonate units (1b) wherein R$^5$ is phenyl can be derived from 2-phenyl-3,3'-bis(4-hydroxy phenyl)phthalimidine (also known as 3,3-bis(4-hydroxyphenyl)-2-phenylisoindolin-1-one, or N-phenyl phenolphthalein bisphenol ("PPPBP")).

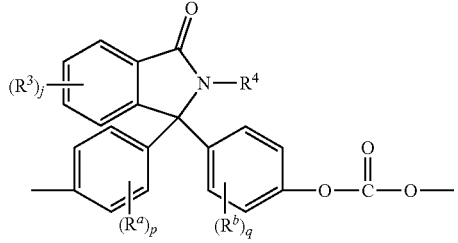
(1a)

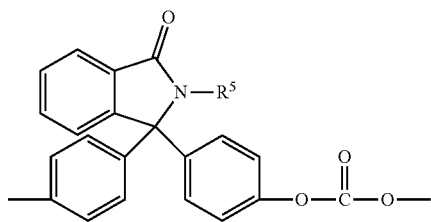
(1b)

Other bisphenol carbonate repeating units of this type are the isatin carbonate units of formula (1c) and (1d), wherein $R^a$ and $R^b$ are each independently $C_{1-12}$ alkyl, p and q are each independently 0 to 4, and $R^i$ is $C_{1-12}$ alkyl, phenyl, optionally substituted with 1 to 5 $C_{1-10}$ alkyl, or benzyl optionally substituted with 1 to 5 $C_{1-10}$ alkyl. Each $R^a$ and $R^b$ can be methyl, p and q can each independently be 0 or 1, and $R^i$ is $C_{1-4}$ alkyl or phenyl.

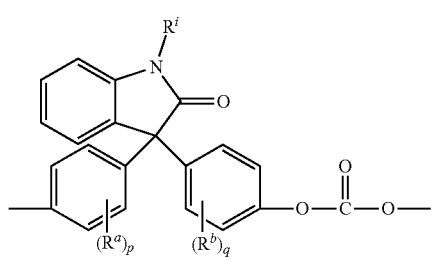
(1c)

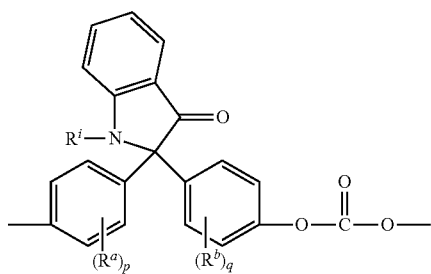
(1d)

Other examples of bisphenol carbonate units derived from bisphenols (3) wherein $X^a$ is a substituted or unsubstituted $C_{3-18}$ cycloalkylidene (4) include the cyclohexylidene-bridged, alkyl-substituted bisphenol of formula (1e)

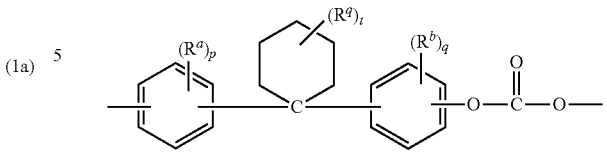
(1e)

wherein $R^a$ and $R^b$ are each independently $C_{1-12}$ alkyl, $R^g$ is $C_{1-12}$ alkyl, p and q are each independently 0 to 4, and t is 0 to 10. At least one of each of $R^a$ and $R^b$ can be disposed meta to the cyclohexylidene bridging group. Each $R^a$ and $R^b$ can independently be $C_{1-4}$ alkyl, $R^g$ is $C_{1-4}$ alkyl, p and q are each 0 or 1, and t is 0 to 5. $R^a$, $R^b$, and $R^g$ can each be methyl, p and q can each be 0 or 1, and t can be 0 or 3, specifically 0.

Examples of other bisphenol carbonate units derived from bisphenol (3) wherein $X^a$ is a substituted or unsubstituted $C_{3-18}$ cycloalkylidene include adamantyl units of formula (1f) and fluorenyl units of formula (1g)

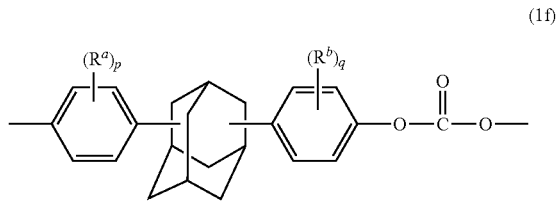
(1f)

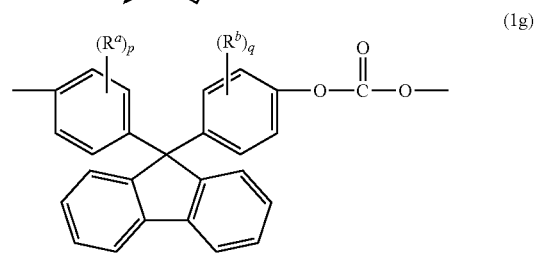
(1g)

wherein $R^a$ and $R^b$ are each independently $C_{1-12}$ alkyl, and p and q are each independently 1 to 4. At least one of each of $R^a$ and $R^b$ can be disposed meta to the cycloalkylidene bridging group. $R^a$ and $R^b$ can each be independently $C_{1-3}$ alkyl, and p and q can be each 0 or 1; specifically, $R^a$, $R^b$ can each be methyl, p and q are each 0 or 1, and when p and q are 1, the methyl group can be disposed meta to the cycloalkylidene bridging group. Carbonates containing units (1a) to (1g) are useful for making polycarbonates with high glass transition temperatures (Tg) and high heat distortion temperatures.

Other useful dihydroxy compounds of the formula HO—$R^1$—OH include aromatic dihydroxy compounds of formula (6), wherein each $R^h$ is independently a halogen atom, $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4. The halogen is usually bromine.

(6)

Some illustrative examples of specific dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxy-dibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing.

Specific examples of bisphenol compounds of formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used. The polycarbonate can be a linear homopolymer derived from bisphenol A, in which each of $A^1$ and $A^2$ is p-phenylene and $Y^1$ is isopropylidene in formula (3).

The polycarbonate herein is prepared via the melt polymerization of a dihydroxy compound and a carbonate compound also referred to as a carbonate precursor. Exemplary carbonate compounds include a carbonyl halide such as carbonyl bromide or carbonyl chloride (phosgene) a bishaloformate of a dihydroxy compound (e.g., the bischloroformate of bisphenol A, hydroquinone ethylene glycol, neopentyl glycol, or the like), and diaryl carbonates. Combinations comprising at least one of the foregoing types of carbonate precursors can also be used. The diaryl carbonate ester can be diphenyl carbonate, or an activated diphenyl carbonate having electron-withdrawing substituents on each aryl, such as bis(4-nitrophenyl)carbonate, bis(2-chlorophenyl)carbonate, bis(4-chlorophenyl) carbonate, bis(methyl salicyl)carbonate, bis(4-methylcarboxylphenyl) carbonate, bis(2-acetylphenyl) carboxylate, bis(4-acetylphenyl) carboxylate, or a combination comprising at least one of the foregoing. The molar ratio of the carbonate compound to the dihydroxy compound can be 0.9 to 1.2, specifically, 0.95 to 1.15.

The present polymerization can occur in the presence of a branching agent. Examples of branching agents include polyfunctional organic compounds containing at least three functional groups selected from hydroxyl, carboxyl, carboxylic anhydride, haloformyl, and mixtures of the foregoing functional groups. Such branching agents include aromatic triacyl halides, for example, triacyl chlorides of formula (20), wherein Z is a halogen, $C_{1-3}$ alkyl, $C_{1-3}$ alkoxy, $C_{7-12}$ arylalkylene, $C_{7-12}$ alkylarylene, or nitro, and z is 0 to 3; a tri-substituted phenol of formula (21), wherein T is a $C_{1-20}$ alkyl, $C_{1-20}$ alkoxy, $C_{7-12}$ arylalkyl, or $C_{7-12}$ alkylaryl, Y is a halogen, $C_{1-3}$ alkyl, $C_{1-3}$ alkoxy, $C_{7-12}$ arylalkyl, $C_{7-12}$ alkylaryl, or nitro, s is 0 to 4. Specific examples of branching agents include trimellitic acid, trimellitic anhydride, trimellitic trichloride, tris-p-hydroxyphenylethane, isatin-bis-phenol of formula (22), tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid.

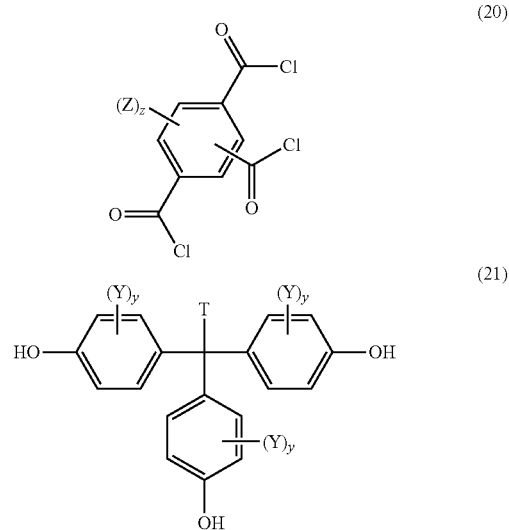

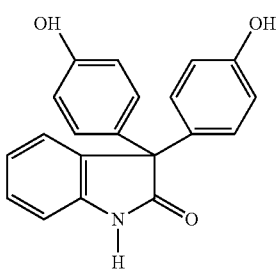

(22)

In the melt polymerization process, the polycarbonate can be prepared by co-reacting, in a molten state, a dihydroxy compound and a carbonate compound in the presence of a transesterification catalyst. The reaction can be carried out in typical polymerization equipment, such as a continuously stirred reactor (CSTR), plug flow reactor, wire wetting fall polymerizers, free fall polymerizers, horizontal polymerizers, wiped film polymerizers, BANBURY mixers, single or twin screw extruders, or a combination comprising one or more of the foregoing. Volatile monohydric phenol is removed from the molten reactants by distillation and the polymer is isolated as a molten residue.

Melt polymerization can be conducted as a batch process or as a continuous process. In either case, the melt polymerization conditions used can comprise two or more distinct reaction stages. For example, the polymerization can comprise a first reaction stage, also referred to as an oligomerization stage, in which the starting dihydroxy compound and carbonate compound are converted into an oligomeric polycarbonate and a second reaction stage, also referred to as a polymerization stage, wherein the oligomeric polycarbonate formed in the first reaction stage is converted to high molecular weight polycarbonate.

The oligomerization stage can comprise 1 or more, specifically, 2 or more, more specifically, 2 to 4 oligomerization units (for example, 2 to 4 continuously stirred tanks). When 2 or more oligomerization units are present in series, one or both of an increase in temperature or a decrease in pressure can occur from one unit to the next. The polymerization stage can comprise 1 or more, specifically, 2 or more, more specifically, 2 polymerization units (for example, 2 horizontal or wire wetting fall polymerizers). The polymerization stage can comprise 1 polymerization unit, where the polymerization unit can polymerize the polycarbonate to an Mn (PC standards) of, for example, 20,000 to 50,000 Da, the polycarbonate composition can then be quenched, and introduced to a devolatization unit.

In the devolatization unit, the molecular weight of the polycarbonate does not significantly increase (for example, the molecular weight does not increase by greater than 10 weight percent (wt %)) and a temperature, a pressure, and a residence time are used to reduce the concentration of low molecular weight components (such as those with a number average molecular weight (PC standards) (Mn) of less than 1,000 Daltons (Da)). An oligomerization stage polymerization unit is herein defined as a polymerization unit that results in polycarbonate oligomers with an Mn of less than or equal to 8,000 Da and a polymerization stage polymerization unit is herein defined as a polymerization unit that produces polycarbonate with an Mn of greater than 8,000 Da. It is noted that while less than or equal to 8,000 Da is used here to define a molecular weight achieved in the first stage, one skilled in the art readily understands that said molecular weight is used to define an oligomerization stage, where the oligomer Mn could be greater than 8,000 Da.

A "staged" polymerization reaction condition can be used in continuous polymerization systems, wherein the starting monomers are oligomerized in a first reaction vessel and the oligomeric polycarbonate formed therein is continuously transferred to one or more downstream reactors in which the oligomeric polycarbonate is converted to high molecular weight polycarbonate. Typically, in the oligomerization stage the oligomeric polycarbonate produced has an Mn of 1,000 to 7,500 Da. In one or more subsequent polymerization stages the Mn of the polycarbonate can be increased to, for example, 8,000 and 25,000 Da (using polycarbonate standard), specifically, 13,000 to 18,000 Da.

Typically, solvents are not used in the process, and the reactants, the dihydroxy compound and the carbonate compound, are in a molten state. The reaction temperature can be 100 to 350 degrees Celsius (° C.), specifically, 180 to 310° C. The pressure can be at atmospheric pressure, supra-atmospheric pressure, or a range of pressures from atmospheric pressure to 15 torr in the initial stages of the reaction, and at a reduced pressure at later stages, for example, 0.2 to 15 torr. Likewise, the polymerization can occur in a series of polymerization vessels that can each individually have increasing temperature and/or vacuum. An oligomerization stage can occur at a temperature of 100 to 280° C., specifically, 140 to 240° C. and a polymerization stage can occur at a temperature of 240 to 350° C., or 280 to 300° C. or 240 to 270° C. or 250 to 310° C., where the temperature in the polymerization stage is greater than the temperature in the oligomerization stage. The reaction time from an initial oligomerization unit to a final polymerization unit can be 0.1 to 15 hours. One or more oligomerization units in the oligomerization stage can each independently be at a pressure of greater than or equal to 100 millibars absolute (mbara). When the oligomerization stage comprises more than one oligomerization unit, a first oligomerization unit can have a pressure of greater than or equal to 100 mbara and a second oligomerization unit can have a pressure of 15 to 90 mbara, where the first oligomerization unit is upstream of the second oligomerization unit, where one or more first stage oligomerization units can be located before, in between, and/or after said oligomerization units.

After a final polymerization vessel (also referred to as a final polymerization unit), the polymer can be introduced to a reactor, extruded, subjected to filtration in a melt filter, or a combination comprising one or more of the foregoing. As used herein the final polymerization unit refers to the unit that performs the final polymerization and where after exiting the final polymerization unit the polymer does not increase in molecular weight by more than 10%, for example, a weight average molecular weight (PC standard) does not increase by more than 10%. It is noted that the melt filter can be located before or after the extruder. For example, the melt polymerization process for the manufacture of a polycarbonate composition can comprise: melt polymerizing a dihydroxy compound and a carbonate compound to produce a molten reaction product; quenching the molten reaction product; filtering the molten reaction product in a melt filter upstream of any extruders; optionally, introducing an additive to form a mixture; and extruding the mixture to form the polycarbonate composition. Likewise, the melt polymerization process for the manufacture of a polycarbonate composition can comprise: melt polymerizing a dihydroxy compound and a carbonate compound to produce a molten reaction product; introducing a quencher composition and optionally an additive to form a mixture; and extruding the mixture to form the polycarbonate composition.

The polycarbonate can have a melt flow rate (MFR) of less than or equal to 10 grams per 10 minutes (g/10 min), specifically, less than or equal to 6 g/10 min measured at 300° C./1.2 kilogram (kg) according to ASTM D1238-04. The polycarbonate can be a low viscosity polycarbonate, for example, the low viscosity polycarbonate can have an MFR of greater than or equal to 10 g/10 min, specifically, greater than or equal to 15 g/10 min, more specifically, greater than or equal to 20 g/10 min, measured at 300° C./1.2 kg according to ASTM D1238-04. The polycarbonate can have an MFR of 2 to 250 g/10 min, specifically, 2 to 10 g/10 min at 300° C./1.2 kg according to ASTM D1238-04. The polycarbonate can have an MFR of 2 to 300 g/10 min, specifically, 2 to 10 g/10 min, more specifically, 5.5 to 7.5 g/10 min at 300° C./1.2 kg according to ASTM D1238-04.

The polycarbonate can have branching from the structures below of less than 6,000 ppm, specifically, less than 2,000 ppm, more specifically, 1,000 to 1,200 ppm, or less than 500 ppm, specifically, less than or equal to 400 ppm.

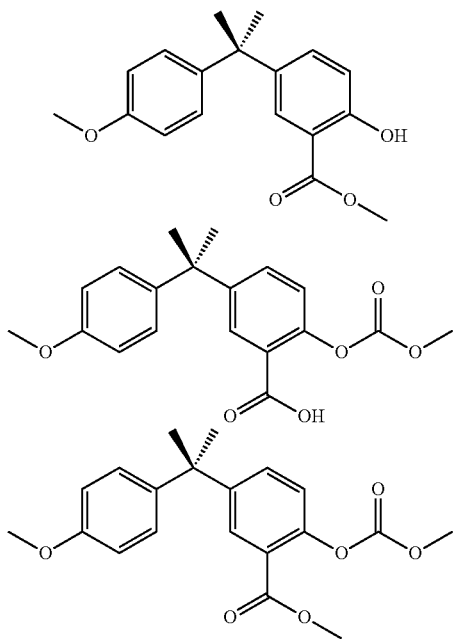

A transesterification catalyst(s) can be employed in the melt polymerization. Transesterification catalysts used in the melt transesterification polymerization production of polycarbonates can include one or both of an alkali catalyst and a quaternary catalyst, wherein the alkali catalyst comprises a source of at least one of alkali ions and alkaline earth ions, and wherein the quaternary catalyst comprising a quaternary ammonium compound, a quaternary phosphonium compound, or a combination comprising at least one of the foregoing. The quaternary catalyst can have a reduced metal salt concentration.

The alkali catalyst comprises a source of one or both of alkali ions and alkaline earth ions. The sources of these ions can include alkaline earth hydroxides such as magnesium hydroxide and calcium hydroxide. Sources of alkali metal ions can include the alkali metal hydroxides such as lithium hydroxide, sodium hydroxide, potassium hydroxide, and combinations comprising at least one of the foregoing. Examples of alkaline earth metal hydroxides are calcium hydroxide, magnesium hydroxide, and combinations comprising at least one of the foregoing. The alkali catalyst can comprise sodium hydroxide. The alkali catalyst typically will be used in an amount sufficient to provide $1\times10^{-2}$ to $1\times10^{-8}$ moles, specifically, $1\times10^{-4}$ to $1\times10^{-7}$ moles of metal hydroxide per mole of the dihydroxy compounds employed. Other possible sources of alkaline earth and alkali metal ions include salts of carboxylic acids (such as sodium acetate) and derivatives of ethylene diamine tetraacetic acid (EDTA) (such as EDTA tetrasodium salt, and EDTA magnesium disodium salt), as well as combinations comprising at least one of the foregoing. For example, the alkali catalyst can comprise alkali metal salt(s) of a carboxylic acid, alkaline earth metal salt(s) of a carboxylic acid, or a combination comprising at least one of the foregoing. In another example, the alkali catalyst comprises $Na_2Mg$ EDTA or a salt thereof.

The alkali catalyst can also, or alternatively, comprise salt(s) of a non-volatile inorganic acid. For example, the alkali catalyst can comprise salt(s) of a non-volatile inorganic acid such as $NaH_2PO_3$, $NaH_2PO_4$, $Na_2HPO_3$, $KH_2PO_4$, $CsH_2PO_4$, $Cs_2HPO_4$, and combinations comprising at least one of the foregoing. Alternatively, or in addition, the alkali catalyst can comprise mixed alkali metal salt(s) of phosphoric acid, such as $NaKHPO_4$, $CsNaHPO_4$, $CsKHPO_4$, and combinations comprising at least one of the foregoing. The alkali catalyst can comprise $KNaHPO_4$, wherein a molar ratio of Na to K is 0.5 to 2.

The quaternary catalyst comprises a quaternary ammonium compound, a quaternary phosphonium compound, or a combination comprising at least one of the foregoing. The quaternary ammonium compound can be organic ammonium compound(s) having structure, $(R^4)_4N^+X^-$, wherein each $R^4$ is the same or different, and is a $C_{1-20}$ alkyl, a $C_{4-20}$ cycloalkyl, or a $C_{4-20}$ aryl; and $X^-$ is an organic or inorganic anion, for example, a hydroxide, halide, carboxylate, sulfonate, sulfate, formate, carbonate, or bicarbonate. Some non-limiting examples of organic quaternary ammonium compounds include tetramethyl ammonium hydroxide, tetrabutyl ammonium hydroxide, tetramethyl ammonium acetate, tetramethyl ammonium formate, tetrabutyl ammonium acetate, and combinations comprising at least one of the foregoing. Tetramethyl ammonium hydroxide is often employed.

The quaternary phosphonium compound can be of organic phosphonium compounds having structure, $(R^5)_4P^+ X^-$, wherein each $R^5$ is the same or different, and is a $C_{1-20}$ alkyl, a $C_{4-20}$ cycloalkyl, or a $C_{4-20}$ aryl; and $X^-$ is an organic or inorganic anion, for example, a hydroxide, phenoxide, halide, carboxylate such as acetate or formate, sulfonate, sulfate, formate, carbonate, or bicarbonate. Where $X^-$ is a polyvalent anion such as carbonate or sulfate, it is understood that the positive and negative charges in the quaternary ammonium and phosphonium structures are properly balanced. For example, where each $R^5$ independently methyl groups and $X^-$ is carbonate, it is understood that $X^-$ represents $2(CO_3^{-2})$.

Examples of organic quaternary phosphonium compounds include tetramethyl phosphonium hydroxide, tetramethyl phosphonium acetate, tetramethyl phosphonium formate, tetrabutyl phosphonium hydroxide, tetraphenyl phosphonium acetate (TPPA), tetraphenyl phosphonium phenoxide (TPPP), tetraethyl phosphonium acetate, tetrapropyl phosphonium acetate, tetrabutyl phosphonium acetate, tetrapentyl phosphonium acetate, tetrahexyl phosphonium acetate, tetraheptyl phosphonium acetate, tetraoctyl phosphonium acetate, tetradecyl phosphonium acetate, tetradodecyl phosphonium acetate, tetratolyl phosphonium acetate, tetramethyl phosphonium benzoate, tetraethyl phosphonium benzoate, tetrapropyl phosphonium benzoate, tetraphenyl phosphonium benzoate, tetraethyl phosphonium formate, tetrapropyl phosphonium formate, tetraphenyl phosphonium formate, tetramethyl phosphonium propionate, tetraethyl phosphonium propionate, tetrapropyl phosphonium propionate, tetramethyl phosphonium butyrate, tetraethyl phosphonium butyrate, and tetrapropyl phosphonium butyrate, and combinations comprising at least one of the foregoing. The quaternary catalyst can comprise TPPP, TPPA, or a combination comprising one or both of the foregoing.

The amount of quaternary catalyst employed is typically based upon the total number of moles of dihydroxy compound employed in the polymerization reaction. When referring to the ratio of quaternary catalyst, for example, phosphonium salt, to all dihydroxy compounds employed in the polymerization reaction, it is convenient to refer to moles of phosphonium salt per mole of the dihydroxy compound(s), meaning the number of moles of phosphonium salt divided by the sum of the moles of each individual dihydroxy compound present in the reaction mixture. The amount of quaternary catalyst (e.g., organic ammonium or phosphonium salts) employed typically will be $1\times10^{-2}$ to $1\times10^{-5}$, specifically, $1\times10^{-3}$ to $1\times10^{-4}$ moles per total mole of the dihydroxy compounds in the reaction mixture.

The quaternary catalyst can have a reduced concentration of metal compounds. For example, the quaternary catalyst can comprise one or more of: a) less than or equal to 2,000 ppm of sodium, specifically, less than or equal to 1,675 ppm of sodium, specifically, less than or equal to 500 ppm of sodium, more specifically, less than or equal to 100 ppm of sodium, even more specifically, less than or equal to 30 ppm of sodium; b) less than or equal to 500 ppm of cesium, specifically, less than or equal to 300 ppm of cesium, more specifically, less than or equal to 135 ppm of cesium; and c) less than or equal to 100 ppm of potassium, specifically, less than or equal to 45 ppm of potassium; based on the total weight of the quaternary catalyst.

The quaternary catalyst can comprise an alkali metal compound, wherein if the compound comprises sodium sulfate, the amount of sodium can be less than or equal to 1,690 ppm, specifically, less than or equal to 1,670 ppm based on the total weight of the quaternary catalyst; if the compound comprises cesium sulfate, the amount of cesium can be less than or equal to 275 ppm, specifically, less than or equal to 252 ppm based on the total weight of the quaternary catalyst; if the compound comprises sodium hydroxide, the amount of sodium can be less than or equal to 35 ppm, specifically, less than or equal to 29 ppm based on the total weight of the quaternary catalyst; if the compound comprises potassium hydroxide, the amount of potassium can be less than or equal to 50 ppm, specifically, less than or equal to 43 ppm based on the total weight of the quaternary catalyst; if the compound comprises cesium hydroxide, the amount of cesium can be less than or equal to 140 ppm, specifically, less than or equal to 132 ppm based on the total weight of the quaternary catalyst; or a combination comprising one or more of the foregoing.

For example, the quaternary catalyst can comprise an alkali metal compound, wherein the amount of sodium can be greater than or equal to 1 ppm, or greater than or equal to 30 ppm, or greater than or equal to 100 ppm; the amount of cesium can be greater than or equal to 10 ppm, or greater than or equal to 30 ppm, or greater than or equal to 50 ppm; the amount of potassium can be greater than 0 ppm, or greater than or equal to 5 ppm, or greater than or equal to 10 ppm; or a combination comprising one or more of the foregoing, wherein the metal amounts are based on the weight of the quaternary catalyst.

Alkali catalysts are transesterification catalysts that are typically more thermally stable than quaternary catalysts, and therefore can be used throughout transesterification, including during oligomerization, and after oligomerization, e.g., in the polymerization vessels, during polymerization. Nearly all of the alkali catalyst (e.g., greater than 80 wt %, specifically greater than 90 wt %) survives the polymerization process. As such, this catalyst is available to catalyze additional (and, for example, unwanted) reactions downstream of the polymerization process, such as in the extruder. A quencher can be added to quench the alkali catalyst.

The quaternary catalyst can be added just upstream of and/or directly into a monomer mixing unit and/or into an oligomerization unit. The alkali catalyst can be added to a polymerization at any stage in the polymerization, for example, upstream of, and/or directly to, and/or after a monomer mixing unit; and/or upstream of, and/or directly to, and/or after a polymerization unit (for example, to a first stage oligomerization unit and/or a second stage polymerization unit). Likewise, the catalyst addition process can be free of an alkali catalyst addition step. For example, the process of adding a quaternary catalyst can comprise adding a quaternary catalyst and one or both of a dihydroxy compound and a carbonate compound to the monomer mixing unit in any order to form a quaternary catalyst mixture. The monomer mixing unit can be at atmospheric pressure. The monomer mixing unit can be maintained at a temperature of 100 to 250° C., specifically, 150 to 200° C., more specifically, 165 to 185° C.

A quencher composition can be added at one or more locations in the present melt preparation of the polycarbonate to reduce the activity of the catalyst. The quencher composition comprises a quenching agent (also referred to herein as a quencher). For example, the quenching agent can comprise a sulfonic acid ester such as an alkyl sulfonic ester of the formula $R_1SO_3R_2$ wherein $R_1$ is hydrogen, $C_1$-$C_{12}$ alkyl, $C_6$-$C_{18}$ aryl, or $C_7$-$C_{19}$ alkylaryl, and $R_2$ is $C_1$-$C_{12}$ alkyl, $C_6$-$C_{18}$ aryl, or $C_7$-$C_{19}$ alkylaryl. Examples of alkyl sulfonic esters include benzenesulfonate, p-toluenesulfonate, methylbenzene sulfonate, ethylbenzene sulfonate, n-butyl benzenesulfonate, octyl benzenesulfonate and phenyl benzenesulfonate, methyl p-toluenesulfonate, ethyl p-toluenesulfonate, n-butyl p-toluene sulfonate, octyl p-toluenesulfonate and phenyl p-toluenesulfonate. The sulfonic acid ester can comprise alkyl tosylates such as n-butyl tosylate. The sulfonic acid ester can be present in the quencher composition in an amount of 0.1 to 10 volume percent (vol %), specifically, 0.1 to 5 vol %, more specifically, 0.5 to 2 vol % based on the total volume of the quencher composition.

The quenching agent can comprise boric acid esters (e.g., $B(OCH_3)_3$, $B(OCH_2CH_3)_3$, and $B(OC_6H_6)_3$), zinc borate, boron phosphate, aluminum stearate, aluminum silicate, zirconium carbonate, zirconium $C_1$-$C_{12}$ alkoxides, zirconium hydroxycarboxylates, gallium phosphide, gallium antimonide, germanium oxide, $C_1$-$C_{32}$ organogermanium compounds, $C_4$-$C_{32}$ tetraorganotin tin compound, $C_6$-$C_{32}$ hexaorganotin compound (e.g., $[(C_6H_6O)Sn(CH_2CH_2CH_2CH_3)_2]_2O$), $Sb_2O_3$, antimony oxide, $C_1$-$C_{32}$ alkylantimony, bismuth oxide, $C_1$-$C_{12}$ alkylbismuth, zinc acetate, zinc stearate, $C_1$-$C_{32}$ alkoxytitanium, and titanium oxide, phosphoric acid, phosphorous acid, hypophosphorous acid, pyrophosphoric acid, polyphosphoric acid, boric acid, hydrochloric acid, hydrobromic acid, sulfuric acid, sulfurous acid, adipic acid, azelaic acid, dodecanoic acid, L-ascorbic acid, aspartic acid, benzoic acid, formic acid, acetic acid, citric acid, glutamic acid, salicylic acid, nicotinic acid, fumaric acid, maleic acid, oxalic acid, benzenesulfinic acid, $C_1$-$C_{12}$ dialkyl sulfates (e.g., dimethyl sulfate and dibutyl sulfate), sulfonic acid phosphonium salts of the formula $(R^a SO_3^-)(PR^b_4)^+$ wherein $R^a$ is hydrogen, $C_1$-$C_{12}$ alkyl, $C_6$-$C_{18}$ aryl, or $C_7$-$C_{19}$ alkylaryl, and each $R^b$ is independently hydrogen, $C_1$-$C_{12}$ alkyl or $C_6$-$C_{18}$ aryl, sulfonic acid derivatives of the formula $A^1$-$(Y^1—SO_3X^1)_m$ wherein $A^1$ is a $C_1$-$C_{40}$ hydrocarbon group having a valence of m, $Y^1$ is a single bond or an oxygen atom, $X^1$ is a secondary or tertiary alkyl group of the formula —$CR^{15}R^{16}R^{17}$, a metal cation of one equivalent, an ammonium cation (e.g., $NR^b_3{}^+$ wherein each $R^b$ is independently hydrogen, $C_1$-$C_{12}$ alkyl or $C_6$-$C_{18}$ aryl), or a phosphonium (e.g., $PR^b_4{}^+$ wherein each $R^b$ is independently hydrogen, $C_1$-$C_{12}$ alkyl or $C_6$-$C_{18}$ aryl) wherein $R^{15}$ is a hydrogen atom or an alkyl group having 1 to 5 carbon atoms, $R^{16}$ is a hydrogen atom, a phenyl group or an alkyl group having 1 to 5 carbon atoms, and $R^{17}$ is the same as or different from $R^{15}$ and has the same definition as $R^{15}$, provided that two of $R^{15}$, $R^{16}$, and $R^{17}$ cannot be hydrogen atoms, and m is an integer of 1 to 4, provided that when $Y^1$ is a single bond, all of $X^1$ in an amount of m cannot be metal cations of one equivalent, a compound of the formula $^+X^2$-$A^2$-$Y^1$—$SO_3^-$ wherein $A^2$ is a divalent hydrocarbon group, $^+X^2$ is a secondary, tertiary or quaternary ammonium cation or a secondary (e.g., tertiary or quaternary phosphonium cation, and $Y^1$ is a single bond or an oxygen atom, a compound of the formula $A^3$-$(^+X^3)_n$-$(R—Y^1—SO_3^-)_n$ wherein $A^3$ is a $C_1$-$C_{40}$ hydrocarbon group having a valence of n, $^+X^3$ is a secondary, tertiary or quaternary ammonium cation (e.g., $NR^b_3{}^+$ wherein each $R^b$ is independently hydrogen, $C_1$-$C_{12}$ alkyl or $C_6$-$C_{18}$ aryl), or a secondary, tertiary or quaternary phosphonium cation (e.g., $PR^b_4{}^+$ wherein each $R^b$ is independently hydrogen, $C_1$-$C_{12}$ alkyl or $C_6$-$C_{18}$ aryl), R is a monovalent $C_1$-$C_{40}$ hydrocarbon group, n is an integer of 2 to 4, and $Y^1$ is a single bond or an oxygen atom, a compound of the formula $A^5$-$Ad^1$-$A^4$-$(Ad^2$-$A^5)_l$ wherein $A^5$ is a divalent or monovalent $C_1$-$C_{40}$ hydrocarbon group, $A^4$ is a divalent $C_1$-$C_{40}$ hydrocarbon group, each of $Ad^1$ and $Ad^2$ is independently an acid anhydride group selected from —$SO_2$—O—$SO_2$—, —$SO_2$—O—CO—, and —CO—O—$SO_2$—, and l is 0 or 1, provided that when l is 0, -$(Ad^2$-$A^5)_l$ is a hydrogen atom or a bond between $A^4$ and $A^5$, in which $A^5$ is a divalent hydrocarbon group or a single bond, aminosulfonic esters having the formula $R_aR_bN$-A-$SO_3R_c$, wherein $R_a$ and $R_b$ are each independently hydrogen, $C_1$-$C_{12}$ alkyl, $C_6$-$C_{22}$ aryl, $C_7$-$C_{19}$ alkylaryl, or $R_a$ and $R_b$, either singly or in combination, form an aromatic or non-aromatic heterocyclic compound with N (e.g., pyrrolyl, pyridinyl, pyrimidyl, pyrazinyl, carbazolyl, quinolinyl, imidazoyl, piperazinyl, oxazolyl, thiazolyl, pyrazolyl, pyrrolinyl, indolyl, purinyl, pyrrolidinyl, or the like), $R_c$ is hydrogen, and A is $C_1$-$C_{12}$ alkyl, $C_6$-$C_{18}$ aryl, or $C_{17}$-$C_{19}$ alkylaryl (e.g., N-(2-hydroxyethyl) piperazine-N'-3-propanesulfonic acid, 1,4,-piperazinebis (ethanesulfonic acid), and 5-dimethylamino-1-napthalenesulfonic acid), ammonium sulfonic esters of the formula $R_aR_bR_cN^+$-A-$SO_3^-$, wherein $R_a$, $R_b$, are each independently hydrogen, $C_1$-$C_{12}$ alkyl, $C_1$-$C_{12}$ aryl, $C_7$-$C_{19}$ alkylaryl, or $R_a$ and $R_b$, either singly or in combination, form an aromatic or non-aromatic heterocyclic compound with N (e.g., pyrrolyl, pyridinyl, pyrimidyl, pyrazinyl, carbazolyl, quinolinyl, imidazoyl, piperazinyl, oxazolyl, thiazolyl, pyrazolyl, pyrrolinyl, indolyl, purinyl, pyrrolidinyl, or the like), $R_c$ is a hydrogen, and A is $C_1$-$C_{12}$ alkyl, $C_6$-$C_{18}$ aryl, or $C_7$-$C_{19}$ alkylaryl, sulfonated polystyrene, methyl acrylate-sulfonated styrene copolymer, and combinations comprising at least one of the foregoing.

The quencher can be added in an amount of greater than or equal to 5 ppm, specifically, greater than or equal to 10 ppm based on the total weight of the polycarbonate. The quencher can be added in an amount of less than or equal to 5 ppm, specifically, less than or equal to 10 ppm based on the total weight of the polycarbonate. The quencher composition can be added to the polymerization unit such that the quencher is added in an amount of 0.5 to 15 ppm, specifically, 1 to 10 ppm, more specifically, 1.5 to 5 ppm, even more specifically, 1.5 to 3 ppm based on the total weight of the polycarbonate. Likewise, the quencher composition can be added to the polymerization unit such that the quencher is added in an amount of 5 to 10 ppm, specifically, 6 to 8 ppm based on the total weight of the polycarbonate. Likewise, the quencher can be added such that the quencher or derivatives thereof are present in an amount of 0.1 to 50 times, specifically, 0.5 to 30 times, per the neutralization equivalent of the catalyst used. The quencher composition can be added as a liquid or a solid composition at one or more locations in the melt preparation of the polycarbonate.

When the quencher composition is added to a polymerization unit and/or to an extruder, the quencher composition can optionally be mixed, for example, by means of a Henschel mixer, and introduced to a feeder, such as a gravimetric feeder, and then fed to a polymerization unit and/or to an extruder through a feeder, such as a side feeder and/or directly into a throat of the extruder.

When the quencher composition is added to a connecting stream that connects a first unit to a second unit, then the connecting stream comprising the added quencher composition can be mixed via, for example, the establishment of a turbulent flow, an in-line mixer, for example, a static mixer located in a pipe that contains the connecting stream and/or in a mixer unit that houses a rotating paddle, for example, a continuously stirred tank. Mixing can occur for 0.3 to 5 minutes (min), for example, 0.5 to 3 min, or 1 to 2 min. Likewise, the quencher composition can be added to the connecting stream without mixing.

The quencher composition can be added after the formation of the polycarbonate composition, for example, after extruding and/or melt filtering. For example, after the polycarbonate composition is prepared, the polycarbonate composition can be mixed with a quencher composition, for example, in an in-line mixer, a twin barrel mixer, or the like, and then pelletized. Likewise, the polycarbonate composition can first be pelletized and then the quencher composition can be introduced. The quencher composition can be added, for example, by flowing or spraying, in the solid or liquid form onto polycarbonate pellets and can optionally be mixed with the pellets in, for example, a melt kneader. In this scenario, an additive can be introduced after the introduction of the quencher composition. For example, a pelletized polycarbonate that is optionally free of an additive, can be combined with a quencher composition and an antioxidant and/or a release agent can then be added.

The polycarbonate composition can be devolatized to remove low molecular weight compounds (such as those with a molecular weight of less than or equal to 1,000 Daltons). Devolatization can occur in a polymerization unit (for example, in a second stage polymerization unit), in a reactor, in an extruder, in a mixer, or in a combination comprising one or more of the foregoing. The polycarbonate can be quenched prior to devolatization. For example, a quencher can be added upstream of and/or directly to an extruder, the extruder can be devolatized, and an additive can be added.

The quencher addition step can comprise mixing the quencher composition with the polycarbonate for a period of time of greater than or equal to 5 seconds prior to the addition to the polycarbonate of any reactive additive, wherein the reactive additive has a reactive OH group or reactive ester group. The quencher composition can be added to the polycarbonate at a pressure of greater than or equal to 2 bars and mixed with the polycarbonate for a period of time of greater than or equal to 5 seconds prior to the addition to the polycarbonate of any additives having a reactive OH group or reactive ester group. As used herein, when referring to "reactive" or a "reactive group", e.g., having a reactive OH⁻ group or a reactive ester group, the reactivity is with respect to polycarbonate.

It is noted that an amount of water can be added to the extruder to devolatize the polycarbonate composition. The amount of water that can be introduced can be 0.1 to 10 wt %, specifically, 0.3 to 5 wt % based on the total weight of the polycarbonate composition.

It has been discovered that changing the terminal end groups (also referred to as the end-cap) of the polycarbonate can result in a melt polycarbonate with improved properties. While adding an end-capping agent is commonly performed in interfacial polycarbonate polymerizations, adding such an agent in melt polycarbonate polymerization becomes more difficult and less profitable due to problems associated with, for example, reduced molecular weight due to chain scission by the end-capping agent, and many end-capping agents have a low volatility, e.g., below the operating conditions used during melt polymerization. The present process has the benefit of being able to easily modify the terminal groups of a melt polycarbonate produced in a continuous process.

The end-capping agent can be added just upstream of and/or into and/or after a final polymerization unit. For example, the end-capping agent can be added after a final polymerization unit, for example, just upstream of and/or directly into an extruder. The end-capping agent can be added upstream of a quencher. It is noted that as used herein, when a first component is added "upstream" of a second component, it is understood that the first component can be added in a location upstream of the addition location of the second component or, where applicable, the first component can be added in the same location, but at a time prior to the addition of the second component. For example, an end-capping agent can be added to a devolatization unit, the polycarbonate can be mixed for an amount of time, and a quencher can be added. Likewise, an end-capping agent can be added to a conduit entering an extruder and a quenching agent can be added directly into the extruder.

When the end-capping agent can be added just upstream of and/or into a final polymerization unit, the end-capping agent can be added as a molten end-capping agent or as a liquid mixture with a solvent (such as anisole, toluene, acetone, or a combination comprising at least one of the foregoing). When the end-capping agent is added just upstream of and/or directly into an extruder, then the end-capping agent can be added as a molten end-capping agent, as a liquid mixture with a solvent (such as anisole, toluene, acetone, or a combination comprising at least one of the foregoing), or as a solid (for example, as a masterbatch mixed with one or more solid components).

When added to a melt polymerization, the end-capping agent not only caps the end of polymerizing polycarbonate chains, but it also attacks carbonate groups in the polycarbonate backbone, causing chain scission, which can result in a reduction in the molecular weight of the polycarbonate. In order to account for the reduction in molecular weight that can occur due to the addition of the end-capping agent, the end-capping agent can be added just upstream of and/or into a final polymerization unit. For example, adding an end-capping agent prior to a final polymerization unit would end-cap an amount of the polycarbonate chains and further polymerization of the non-end-capped polycarbonate could occur in the final polymerization unit to increase the average molecular weight. Likewise, the loss in molecular weight can be accounted for by setting the polymerization conditions to attain a target molecular weight, where the target molecular weight is the molecular weight that the polycarbonate would attain if the chain-capping agent was not added. In this case, the addition of the end-capping agent reduces the molecular weight of the polycarbonate from the target molecular to result in a polycarbonate of the desired molecular weight.

The end-capping agent can be added to the polycarbonate that has a number average molecular weight (using polycarbonate standard) of greater than or equal to 8,000 Daltons, specifically, greater than or equal to 15,000 Daltons, more specifically, greater than or equal to 20,000 Daltons.

A feedback loop can be employed to monitor the present process, where, for example, the viscosity of the polycarbonate can be monitored and the flow rate of the end-capping agent can be adjusted based on the measured viscosity.

An end-capping agent (also referred to as a chain stopper or chain terminating agent) is included during polymerization to provide end groups. Examples of end-capping agents include substituted or unsubstituted mono-phenolic compounds. The end-capping agent can comprise a mono-phenolic end-capping agent (such as a monocyclic phenol such as phenol and $C_1$-$C_{22}$ alkyl-substituted phenols such as p-cumyl-phenol, dicumyl phenol, resorcinol monobenzoate, and p- and tertiary-butyl phenol); a monoether of diphenols (such as p-methoxyphenol); a $C_{8-9}$ alkyl-substituted phenol with branched chain alkyl substituents; or a combination comprising one or more of the foregoing. The end-capping agent can comprise a mono-phenolic UV absorber, for example, 4-substituted-2-hydroxybenzophenones and their derivatives, an aryl salicylate, a monoester of a diphenol such as resorcinol monobenzoate, 2-(2-hydroxyaryl)-benzotriazoles and their derivatives, 2-(2-hydroxyaryl)-1,3,5-triazines and their derivatives, and the like. The end-capping agent can comprise a combination comprising one or more of the foregoing. The end-capping agent can be added in an amount of 100 to 20,000 ppm based on the total weight of the PC.

When the end-capping agent is added just upstream of and/or directly into a polymerization unit, the molecular weight of the polycarbonate exiting that unit can be within 10% of the molecular weight entering that unit. It is noted that the phrase "just upstream of" and "just prior to" refers to adding a component into a stream prior to the designated unit, where the first unit the agent enters is the designated unit. In other words, the component is added to a stream in transit from an upstream unit and that is entering the designated unit.

The end-capping agent can comprise a high volatility end-capping agent (for example, para cumyl phenol, para-tert-butyl phenol, or a combination comprising one or both of the foregoing), where the high volatility end-capping agent has a higher volatility than the dihydroxy compound or a similar volatility (where a similar volatility can mean that the end-capping agent has a boiling point of within 15° C. of the boiling point of the dihydroxy compound) at the operating conditions used. If a high volatility end-capping agent is added just prior to and/or directly into a final polymerization unit, a portion, for example, 25 mol %, will be lost due to volatilization. Therefore, if a high volatility end-capping agent is added just prior to and/or directly into a final polymerization unit, then the amount added should account for this loss. For example, the amount of high volatility end-capping agent added can be 5 to 45 mol %, specifically, 10 to 35 mol %, more specifically, 20 to 30 mol % more than the amount needed to achieve a desired end-capping. In order to reduce loss of the high volatility end-capping agent, the high volatility end-capping agent can be added after a final polymerization and upstream of an addition of a quenching agent, for example, just prior to and/or directly to the extruder or any finishing equipment. The addition and reaction of the high volatility end-capping agent can occur at conditions where devolatization and loss of the high volatility end-capping agent is minimized. The high volatility end-capping agent can be added just upstream of and/or into a unit (such as a tubular polymerization unit and a blending extruder) that is operated at a temperature and pressure wherein less than or equal to 20 wt %, specifically, less than or equal to 10 wt % of the end-capping agent volatilizes (based upon a total weight of the end-capping agent).

The end-capping agent can comprise a low volatility end-capping agent (for example, dicumyl phenol), where the low volatility end-capping agent has a volatility that is less than the volatility of the dihydroxy compound at the operating conditions. The low volatility end-capping agent can be added just prior to and/or directly to the final polymerization unit as less than or equal to 10 wt %, specifically, less than or equal to 5 wt %, more specifically, 2.5 wt % of the low volatility end-capping agent will be lost in the final polymerization unit, e.g., due to volatilization.

FIG. 1 illustrates a melt polycarbonate polymerization system. Initially, dihydroxy compound A and carbonate compound B are added at a fixed molar ratio along with quaternary catalyst C to a pre-mix vessel 10 to form a pre-mixture. The pre-mix vessel 10 can be maintained at 160 to 180° C. and atmospheric pressure. The pre-mixture, additional carbonate compound B, and alkali catalyst D, where the additional carbonate compound B can be the same or different as that added to the pre-mixer, is sent to a first oligomerization vessel 20. The first oligomerization vessel 20 can operate at a temperature of 230 to 260° C. and a vacuum of 140 to 200 millibar atmosphere (mbara) and phenol byproduct from polymerization reaction is removed. The mixture then flows into a second oligomerization vessel 21 that can operate at a higher temperature of 270 to 290° C. and a deeper vacuum of 30 to 50 mbara, e.g., for further phenol removal. The prepolymer, as formed in the oligomerization vessel 21, then flows to a first polymerization vessel 30 that can operate at a temperature of 290 to 315° C. and 1 to 2.5 mbara. The effluent from the first polymerization vessel 30 can be directed to a second polymerization vessel 31 that can operate at 290 to 315° C. and 0.5 to 1.5 mbara to result in the formation of a molten polycarbonate. It is noted that phenol by-product E and any solvent can be removed, for example, by a scrubber 50, from the oligomerization vessel 20, 21 and/or from the polymerization vessel 30, 31. End-capping agent G can be added upstream of and/or to the second polymerization vessel 31 and/or upstream of and/or directly into extruder 40 (for example, to the throat of the extruder 40, 41 and/or through a side stuffer). It is noted that while FIG. 1 illustrates polymerization vessels 30, 31 to be horizontal polymerization units, polymerization vessels 30 and 31 can likewise each independently be, for example, a wire wetting fall polymerization unit or a continuously stirred tank.

The polycarbonate then flows to an extruder 40 where quencher H and additive I are added to the molten polycarbonate. The extruder 40 can be a twin-screw extruder and at least one of the components can be incorporated into the composition by feeding directly into the extruder 40 at the throat and/or downstream of the throat through, for example, a sidestuffer. Additive I can also be compounded into a masterbatch with a desired polymeric resin and fed into the extruder 40. After the extruder 40, the resulting polycarbonate is pumped through a melt filter 60 that can be a stainless steel filter and that has a 2.5 to 50 micrometer, specifically, a 10 to 40 micrometer, more specifically, a 15 to 30 micrometer mesh size, e.g., to remove gels and other impurities from the polycarbonate J. The product can then be stranded in a die-head and finally pelletized and packaged. The pellets, so prepared, when cutting the extrudate can be, for example, one-fourth inch long or less as desired. Such pellets can be used for subsequent molding, shaping, or forming. Typical nominal throughput per line ranges from 3 to 25 tons per hour.

The polymerization process can comprise splitting of a polycarbonate stream into two or more streams that may or may not experience the same polymerization conditions thereafter (i.e., they can attain different molecular weights, have different additives added thereto, etc.). For example, polycarbonate can be prepared in a first portion of the polymerization process; a stream comprising polycarbonate can be split into two or more streams and directed to 2 or more operating lines. For example, a process can comprise polymerizing polycarbonate in a series of oligomerization units; a stream exiting the oligomerization stage can be split into two streams: A and B, where stream A is directed to polymerization unit A and stream B is directed to polymerization unit B. Likewise, a process can comprise polymerizing polycarbonate in a series of oligomerization units followed by polymerizing in a series of polymerization units; a stream exiting the polymerization stage can be split into two streams: A and B, where stream A is directed to extruder A and stream B is directed to extruder B. Likewise, a process can comprise polymerizing polycarbonate in a series of oligomerization units followed by polymerizing in a series of two polymerization units; a stream exiting the first polymerization unit can be split into two streams: A and B, where stream A is directed to second polymerization unit A and stream B is directed to second polymerization unit B. In any of the aforementioned scenarios, a quencher composition can be added to one or both of streams A and B, where the quencher composition can be the same or different. One skilled in the art can readily envision other embodiments comprising more than 2 streams and embodiments where the streams are split at different locations. A chain scission agent can be added to one or more of the streams.

An additive can further be added at one or more locations in the present melt preparation of the polycarbonate. For example, the additive can be added upstream of a polymerization unit, directly into a polymerization unit (for example, at an inlet, in a side feeder, in an outlet, or a combination comprising one or more of the foregoing), downstream of a polymerization unit, in a reactor that is not polymerizing polycarbonate, upstream of an extruder, directly into an extruder (for example, at the throat of the extruder, in a side feeder, in an outlet, or a combination comprising one or more of the foregoing), downstream of an extruder, or a combination comprising one or more of the foregoing. The additive can be added as part of the quencher composition and/or can be added separately. For example, a quencher composition comprising a heat stabilizer can be added to the polycarbonate and an additive composition comprising a release agent and a UV agent can be added to the quenched composition. The additive can be added in a molten state or can be added after an extruded polycarbonate is re-melted. The additive can be filtered prior to being added into the polymerization unit.

The additive can comprise, for example, an impact modifier, a flow modifier, a filler (e.g., a particulate polytetrafluoroethylene (PTFE), glass, carbon, a mineral, or metal), a reinforcing agent (e.g., glass fibers), an antioxidant, a heat stabilizer, a light stabilizer, an ultraviolet (UV) agent (such as a UV light stabilizer and a UV absorbing additive), a plasticizer, a lubricant, a release agent (such as a mold release agent (such as glycerol monostearate, pentaerythritol stearate, glycerol tristearate, stearyl stearate, and the like)), an antistatic agent, an antifog agent, an antimicrobial agent, a colorant (e.g., a dye or pigment), a surface effect additive, a radiation stabilizer, a flame retardant, an anti-drip agent (e.g., a PTFE-encapsulated styrene-acrylonitrile copolymer (TSAN)), or a combination comprising one or more of the foregoing. For example, a combination of a heat stabilizer, mold release agent, and ultraviolet light stabilizer can be used. In general, the additives are used in the amounts generally known to be effective. For example, the total amount of the additive composition (other than any impact modifier, filler, or reinforcing agent) can be 0.001 to 10.0 wt %, or 0.01 to 5 wt %, each based on the total weight of the polymer in the composition.

The polycarbonate can have a light transparency of greater than 85% as determined using 3.2 mm thick samples using ASTM D1003-00, Procedure B using CIE standard illuminant C, with unidirectional viewing. Accordingly, when the polycarbonate has such a light transparency, it is herein referred to as an "optical grade" polycarbonate.

The following examples are provided to illustrate the present method. The examples are merely illustrative and are not intended to limit devices made in accordance with the disclosure to the materials, conditions, or process parameters set forth therein.

EXAMPLES

Examples 1-10 were performed in a continuous melt polycarbonate plant, as illustrated in FIG. 1. In the experiments, 39.8 kilograms per hour (kg/h) of BPA (dihydroxy compound A) and 37.3 kg/h of DPC (carbonate compound B) having a molar ratio of DPC to BPA=1.0 were fed to pre-mix vessel 10. Pre-mix vessel 10 was a continuously stirred vessel operating at atmospheric pressure and 170° C. A 3.2 wt % aqueous solution of tetrabutyl phosphonium acetate (quaternary catalyst C) was also added to the vessel at a rate of 83 milliliter per hour (ml/h), providing an equilibrated mixture of unreacted monomers, phenol, and low molecular oligomers.

Additional DPC (1.67 kg/h) (carbonate compound B) and 1.3 milliliter per minute (ml/min) of an aqueous solution of 50 ppm of NaKHPO$_4$ (alkali catalyst D) were added to the outlet stream of pre-mix vessel 10 and then pumped to first oligomerization vessel 20, which operated at 257° C. and 180 mbar vacuum so that reaction byproduct, phenol, was removed and progressing the reaction. The vapor phase containing phenol and unreacted monomers BPA and DPC was continuously distilled in scrubber 50, where the reflux ratio was adjusted so that the column head temperature was 127° C. to yield high purity phenol and to recover the unreacted BPA and DPC back into first oligomerization vessel 20.

The outlet stream of first oligomerization vessel 20 was then pumped to oligomerization vessel 21, operating at a temperature of 280° C. and a vacuum of 37 mbar to further displace the reaction equilibrium and drive the reaction forward. The effluent of oligomerization vessel 21 was conveyed to the forthcoming polymerization section where two horizontal polymerization reactors, polymerization vessels 30 and 31, connected in series were used to reach the final viscosity target.

Polymerization vessel 30 operated at 300° C. and 2.5 to 3.0 mbar vacuum. Phenol was removed due to the process conditions applied and the reaction mixture therein was continuously agitated by an agitator. The polymer stream exiting polymerization vessel 30 had a weight average molecular weight ($M_w$) of 42,500 Dalton (Polystyrene standard) and was then pumped to polymerization vessel 31 that operated at a deeper vacuum of 1.0 to 1.5 mbar to further build polycarbonate viscosity.

Examples 1-5

Addition of the End-capping Agent to the Second Polymerization Vessel

In Examples, 1-5, a liquid comprising the endcapping agent was added to the polymerization vessel 31 at different flowrates depending on the amount of end-capping agent desired. The product polycarbonate exiting polymerization vessel 31 was then introduced to a six-barrel twin-screw extruder 40 to mix polymer with quencher and additives for specific applications. Polycarbonate exiting the extruder was filtered and pelletized.

In Experiment 1, the end-capping agent added was p-hydroxybenzonitrile (HBN), which is a volatile endcapping agent with a boiling point of more than 15° C. less than the boiling point of BPA at the operating temperature and pressure.

In Experiments 2 and 3, the end-capping agent added was p-cumylphenol (PCP) that has a similar volatility as BPA with a boiling point that is about +/−15° C. of the boiling point of BPA at the operating temperature and pressure.

In Experiments 4 and 5, the end-capping agent added was dicumylphenol (DCP) that has a lower volatility than BPA with a boiling point that is least 15° C. greater than BPA at the operating temperature and pressure.

Details on endcapping amounts and retention and resulting molecular weights are shown in Table 1.

TABLE 1

|  | Example | | | | |
| --- | --- | --- | --- | --- | --- |
|  | 1 | 2 | 3 | 4 | 5 |
| End-capping agent | HBN | PCP | PCP | DCP | DCP |
| End-capping agent (ppm) | 3,500 | 5,000 | 3,000 | 5,000 | 7,000 |
| Retained end-capping agent (ppm) | 2,167 | 4,364 | 2,550 | 4,829 | 6,588 |
| Unreacted end-capping agent (ppm) | 0 | 39 | 42 | 97 | 75 |

TABLE 1-continued

| | Example | | | | |
|---|---|---|---|---|---|
| | 1 | 2 | 3 | 4 | 5 |
| Retention of end-capping agent (wt %) | 61.9 | 88.1 | 86.4 | 98.5 | 95.2 |
| $M_w$ (Dalton) | 43,041 | 45,548 | 46,093 | 45,856 | 45,803 |

Table 1 shows that using an end-capping agent that has a lower volatility than the dihydroxy compound can result in a higher retention of the end-capping agent, for example, as illustrated in the end-capping agent retention of 98.5 wt % and 95.2 wt % in Examples 4 and 5, respectively.

Examples 6-10

Addition of the End-Capping Agent to the Extruder

The melt polymerization of Examples 6-10 were performed similar to Examples 1-5 except that the end-capping agent was added downstream of polymerization vessel 31 in extruder 40. Extruder 40 was operating under conditions were no vacuum was being applied. The weight average molecular weight (PS standards) of the polycarbonate after polymerization vessel 31 was 57,800 Daltons. Any quenching and additive addition was done downstream the end-capping agent addition point.

Details on endcapping amounts and retention and resulting molecular weights are shown in Table 2.

TABLE 2

| | Example | | | | |
|---|---|---|---|---|---|
| | 6 | 7 | 8 | 9 | 10 |
| End-capping agent | HBN | PCP | PCP | DCP | DCP |
| End-capping agent (ppm) | 3,500 | 5,000 | 3,000 | 5,000 | 7,000 |
| Retained end-capping agent (ppm) | 3,324 | 4,920 | 2,958 | 4,780 | 6,530 |
| Unreacted end-capping agent (ppm) | 114 | 25 | 28 | 67 | 93 |
| Retention (wt %) | 98.2 | 98.9 | 99.5 | 96.9 | 94.6 |
| $M_w$ (Dalton) | 43,075 | 41,034 | 42,773 | 45,706 | 38,579 |

Table 2 illustrates that adding the end-capping agent downstream of the polymerization unit, for example, to an extruder results in a high retention of the end-capping agent, for example, of greater than 90 wt %.

Comparing Tables 1 and Table 2, it can be observed that when an end-capping agent is added that has a similar or higher volatility than the dihydroxy compound, then the end-capping agent can be added downstream of the polymerization unit, for example, to an extruder in order to reduce the loss of the end-capping agent, for example, through an overhead stream and to increase its retention.

Set forth below are embodiments for melt polymerizing polycarbonate and the polycarbonate made therefrom.

Embodiment 1: A melt polymerization process comprising: melt polymerizing a carbonate compound and a dihydroxy compound in the presence of a catalyst composition to form a polycarbonate; and adding an end-capping agent comprising a mono-phenolic compound to the polycarbonate, wherein the adding of the end-capping agent comprises at least one of adding the end-capping agent just upstream of a final polymerization unit, adding the end-capping agent directly into the final polymerization unit, and adding the end-capping agent downstream of the final polymerization unit; wherein a molecular weight of the polycarbonate increases by less than 10% downstream of the final polymerization unit.

Embodiment 2: A process for end-capping a polycarbonate in a melt polymerization process comprising: melt polymerizing a carbonate compound and a dihydroxy compound in the presence of a catalyst composition to form the polycarbonate; determining a desired end-cap level; and adding an end-capping agent comprising a mono-phenolic compound to the polycarbonate to attain the desired end-cap level, wherein the adding the end-capping agent comprises at least one of adding the end-capping agent just upstream of a final polymerization unit, adding the end-capping agent directly into the final polymerization unit, and adding the end-capping agent downstream of the final polymerization unit; wherein a molecular weight of the polycarbonate increases by less than 10% downstream of the final polymerization unit.

Embodiment 3: The process of any of the preceding Embodiments, wherein the adding comprises adding the end-capping agent just upstream of and/or directly into a polymerization unit and the molecular weight of the polycarbonate exiting the polymerization unit is within 10% of the molecular weight entering the polymerization unit.

Embodiment 4: The process of any of the preceding Embodiments, wherein the end-capping agent comprises a monocyclic phenol, a $C_{1-22}$ alkyl-substituted phenol, a monoether of diphenols, a $C_{8-9}$ alkyl-substituted phenol with branched chain alkyl substituents, a mono-phenolic UV absorber, or a combination comprising one or more of the foregoing.

Embodiment 5: The process of any of the preceding Embodiments, wherein the end-capping agent comprises phenol, p-cumyl-phenol, dicumyl phenol, resorcinol monobenzoate, p-butyl phenol, tertiary-butyl phenol, p-methoxyphenol, a 4-substituted-2-hydroxybenzophenone, an aryl salicylate, resorcinol monobenzoate, a 2-(2-hydroxyaryl)-benzotriazole, a 2-(2-hydroxyaryl)-1,3,5-triazine, or a combination comprising one or more of the foregoing.

Embodiment 6: The process of any of the preceding Embodiments, wherein the end-capping agent comprises para cumyl phenol, dicumyl phenol, p-tert-butyl phenol, or a combination comprising one or more of the foregoing.

Embodiment 7: The process of any of the preceding Embodiments, wherein adding the end-capping agent occurs after a final polymerization unit and before an extruder and/or occurs directly into an extruder.

Embodiment 8: The process of any of the preceding Embodiments, wherein the end-capping agent is added in an amount of 100 to 20,000 ppm based on the total weight of the polycarbonate.

Embodiment 9: The process of any of the preceding Embodiments, wherein the end-capping agent comprises a high volatility end-capping agent, wherein the high volatility end-capping agent has a higher or the same volatility than the dihydroxy compound; wherein the high volatility end-capping agent can be added downstream of the final polymerization unit; wherein the high volatility end-capping agent can have a boiling point that is less than or equal to (wherein equal can mean within 15° C. of) a boiling point of the dihydroxy compound at the same conditions; wherein the high volatility end-capping agent can have a boiling point ($BP_{highv}$) that is less than or equal to 15° C.+a boiling point of the dihydroxy compound ($BP_{dih}$) [$BP_{highv}$ less than or equal to 15° C.+$BP_{dih}$].

Embodiment 10: The process of any of the preceding Embodiments, wherein the end-capping agent comprises a low volatility end-capping agent, wherein the low volatility end-capping agent has a volatility that is less than the volatility of the dihydroxy compound; wherein the low volatility end-capping agent can be added just upstream of, directly into, or downstream of the final polymerization unit; wherein the low volatility end-capping agent can have a boiling point that is greater than a boiling point of the dihydroxy compound at the same conditions; wherein the low volatility end-capping agent can have a boiling point ($BP_{lowv}$) that is greater than 15° C.+a boiling point of the dihydroxy compound ($BP_{dih}$) [$BP_{lowv}$ greater than 15° C.+$BP_{dih}$].

Embodiment 11: The process of any of the preceding Embodiments, wherein the catalyst comprises tetraphenyl phosphonium acetate, tetraphenyl phosphonium phenolate, or a combination comprising one or both of the foregoing.

Embodiment 12: The process of any of the preceding Embodiments, further comprising adding a quencher composition to the polycarbonate; and mixing the quencher composition with the polycarbonate for a period of time of greater than or equal to 5 seconds prior to the addition to the polycarbonate of any reactive additive, wherein the reactive additive has a reactive OH group or reactive ester group.

Embodiment 13: The process of Embodiment 12, wherein the quencher composition comprises at least one of 1 to 10 ppm of a sulfonic acid ester, based upon 100 parts of the polycarbonate, and 1 to 10 ppm phosphorous acid, based upon 100 parts of the polycarbonate.

Embodiment 14: A polycarbonate prepared by the process of any of the preceding Embodiments.

Embodiment 15: The polycarbonate of Embodiment 14, wherein the polycarbonate has an end-capping level of greater than or equal to 65%.

Embodiment 16: The polycarbonate of Embodiment 15, wherein the polycarbonate has an end-capping level of greater than or equal to 85%.

Embodiment 17: The polycarbonate of any of Embodiments 14-16, wherein the polycarbonate has a branching level of less than or equal to 500 ppm and/or an MFR of greater than or equal to 10 g/10 min at 300° C./1.2 kg (ASTM D1238-04 or ISO 1133).

Embodiment 18: A melt polymerization system, comprising: a carbonate source supply; a dihydroxy compound supply; a catalyst supply; an oligomerization unit in operable communication with the carbonate source supply, the dihydroxy compound supply, and the catalyst supply; a polymerization unit in operable communication with the oligomerization unit; an extruder in operable communication with the polymerization unit; and an end-capping agent supply configured to introduce end-capping agent downstream of the oligomerization unit.

Embodiment 19: The system of Embodiment 18, further comprising a premix vessel configured to mix a carbonate precursor from the carbonate source and a dihydroxy compound from the dihydroxy source, wherein the premix vessel is upstream from and in operable communication with the oligomerization unit; a final polymerization unit downstream of and in operable communication with the polymerization unit, wherein a molecular weight of polycarbonate formed in the system increases by less than 10% downstream of the final polymerization unit; and an extruder downstream of and in operable communication with the final polymerization unit; wherein the end-capping agent supply is configured to introduce end-capping agent downstream of the polymerization unit.

Embodiment 20: The system of any of Embodiments 18-19, further comprising a second dihydroxy compound supply and an additional catalyst supply; wherein the additional catalyst supply comprises an alkali catalyst, wherein the quaternary catalyst supply is configured to introduce the alkali catalyst upstream of and/or into the oligomerization unit, wherein the alkali catalyst comprises a source of at least one of alkali ions and alkaline earth ions.

Embodiment 21: The process of any one of Embodiments 1-13, wherein the adding of the end-capping agent comprises adding a solid end-capping agent, a molten end-capping agent, or a liquid mixture comprising a solvent and the end-capping agent just upstream of and/or directly into an extruder located downstream of the final polymerization unit.

Embodiment 22: The process of any one of Embodiments 1-13 and 22, wherein the adding of the end-capping agent comprises adding a molten end-capping agent or a liquid mixture comprising a solvent and the end-capping agent just upstream of and/or into the final polymerization unit.

As used herein, when referring to "reactive" or a "reactive group", e.g., having a reactive OH⁻ group or a reactive ester group, the reactivity is with respect to polycarbonate.

In general, the disclosure can alternately comprise, consist of, or consist essentially of, any appropriate components herein disclosed. The disclosure can additionally, or alternatively, be formulated so as to be devoid, or substantially free, of any components, materials, ingredients, adjuvants or species used in the prior art compositions or that are otherwise not necessary to the achievement of the function and/or objectives of the present disclosure.

All ranges disclosed herein are inclusive of the endpoints, and the endpoints are independently combinable with each other (e.g., ranges of "up to 25 wt %, or, more specifically, 5 to 20 wt %", is inclusive of the endpoints and all intermediate values of the ranges of "5 to 25 wt %," etc.). "Combination" is inclusive of blends, mixtures, alloys, reaction products, and the like. Furthermore, the terms "first," "second," and the like, herein do not denote any order, quantity, or importance, but rather are used to denote one element from another. The term "or" means and/or. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. Disclosure of a narrower range or more specific group in addition to a broader range is not a disclaimer of the broader range or larger group.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

This application claims the benefit of European Patent Application Serial No. EP14382460 filed 19 Nov. 2014. The related application is incorporated herein in its entirety by reference.

I claim:

1. A melt polymerization process comprising:
   melt polymerizing a carbonate compound and a dihydroxy compound in the presence of a catalyst composition to form a polycarbonate; and
   adding an end-capping agent consisting essentially of a mono-phenolic compound to the polycarbonate, wherein the adding of the end-capping agent comprises at least one of adding the end-capping agent just upstream of a final polymerization unit, adding the end-capping agent directly into the final polymerization unit, and adding the end-capping agent downstream of the final polymerization unit; wherein a molecular weight of the polycarbonate increases by less than 10% downstream of the final polymerization unit.

2. A process for end-capping a polycarbonate in a melt polymerization process comprising:
   melt polymerizing a carbonate compound and a dihydroxy compound in the presence of a catalyst composition to form the polycarbonate;
   determining a desired end-cap level; and
   adding an end-capping agent comprising a mono-phenolic compound to the polycarbonate to attain the desired end-cap level, wherein the adding the end-capping agent comprises at least one of adding the end-capping agent just upstream of a final polymerization unit, adding the end-capping agent directly into the final polymerization unit, and adding the end-capping agent downstream of the final polymerization unit; wherein a molecular weight of the polycarbonate increases by less than 10% downstream of the final polymerization unit.

3. The process of claim 1, wherein the adding comprises adding the end-capping agent just upstream of and/or directly into the final polymerization unit and a final weight average molecular weight (polycarbonate standard) of the polycarbonate exiting the polymerization unit is within 10% of an initial weight average molecular weight (polycarbonate standard) of the polycarbonate entering the polymerization unit.

4. The process of claim 1, wherein the mono-phenolic compound comprises a monocyclic phenol, a $C_{1-22}$ alkyl-substituted phenol, a monoether of diphenols, a $C_{8-9}$ alkyl-substituted phenol with branched chain alkyl substituents, a mono-phenolic UV absorber, or a combination comprising one or more of the foregoing.

5. The process of claim 1, wherein the mono-phenolic compound comprises phenol, p-cumyl-phenol, dicumyl phenol, resorcinol monobenzoate, p-butyl phenol, tertiary-butyl phenol, p-methoxyphenol, a 4-substituted-2-hydroxybenzophenone, an aryl salicylate, resorcinol monobenzoate, a 2-(2-hydroxyaryl)-benzotriazole, a 2-(2-hydroxyaryl)-1,3,5-triazine, or a combination comprising one or more of the foregoing.

6. The process of claim 1, wherein adding the end-capping agent occurs after a final polymerization unit and before an extruder and/or occurs directly into an extruder.

7. The process of claim 1, wherein the end-capping agent is added in an amount of 100 to 20,000 ppm based on the total weight of the polycarbonate.

8. The process of claim 1, wherein the end-capping agent comprises a high volatility end-capping agent, wherein the high volatility end-capping agent has a higher or the same volatility than the dihydroxy compound and/or wherein the end-capping agent comprises a low volatility end-capping agent, wherein the low volatility end-capping agent has a volatility that is less than the volatility of the dihydroxy compound.

9. The process of claim 1, wherein the catalyst comprises tetraphenyl phosphonium acetate, tetraphenyl phosphonium phenolate, or a combination comprising one or both of the foregoing.

10. The process of claim 1, further comprising adding a quencher composition to the polycarbonate; and mixing the quencher composition with the polycarbonate for a period of time of greater than or equal to 5 seconds prior to the addition to the polycarbonate of any reactive additive, wherein the reactive additive has a reactive OH group or reactive ester group.

11. A polycarbonate prepared by the process of claim 1.

12. The polycarbonate of claim 11, wherein the polycarbonate has an end-capping level of greater than or equal to 65%.

13. The polycarbonate of claim 11, wherein the polycarbonate has a branching level of less than or equal to 500 ppm and/or a melt flow rate of greater than or equal to 10 g/10 min measured at 300° C/1.2 kg according to ASTM D1238-04 or ISO 1133.

14. The process of claim 1, wherein the end-capping agent consists of the mono-phenolic compound.

15. A melt polymerization process comprising:
   melt polymerizing a carbonate compound and a dihydroxy compound in the presence of a catalyst composition to form a polycarbonate; and
   adding an end-capping agent comprising a mono-phenolic compound to the polycarbonate, wherein the end-capping agent comprises one or both of a high volatility end-capping agent and a low volatility end-capping agent;
   wherein if the end-capping agent comprises the high volatility end-capping agent that has a higher or the same volatility than the dihydroxy compound, then the high volatility end-capping agent is added downstream of the final polymerization unit; and
   wherein if the end-capping agent comprises the low volatility end-capping agent that has a lower volatility than the dihydroxy compound, then the low volatility end-capping agent is added just prior to and/or directly to the final polymerization unit; and
   wherein a molecular weight of the polycarbonate increases by less than 10% downstream of the final polymerization unit.

16. The process of claim 1, wherein the mono-phenolic compound comprises p-hydroxybenzonitrile.

17. The process of claim 1, wherein the mono-phenolic compound comprises dicumylphenol.

* * * * *